United States Patent [19]
Vance

[11] 3,763,914
[45] Oct. 9, 1973

[54] TIRE TRUEING MACHINE
[76] Inventor: Edison G. Vance, 6200 Nebraska Ave., Tampa, Fla.
[22] Filed: July 8, 1971
[21] Appl. No.: 160,628

[52] U.S. Cl. .................................................. 157/13
[51] Int. Cl. ............................................ B29h 21/08
[58] Field of Search ...................................... 157/13

[56] References Cited
UNITED STATES PATENTS

| | | | |
|---|---|---|---|
| 2,897,882 | 8/1959 | Barrett................................ | 157/13 |
| 2,717,640 | 9/1955 | Schnoebelen........................ | 157/13 |
| 2,924,268 | 2/1960 | Holton et al........................ | 157/13 |
| 3,081,817 | 3/1963 | Hemmeter........................... | 157/13 |
| 3,614,973 | 10/1971 | Jensen et al........................ | 157/13 |

*Primary Examiner*—Granville Y. Custer, Jr.
*Attorney*—Stefan M. Stein

[57] ABSTRACT

A device for trueing automotive tires by abrasively removing non-symmetrical, non-concentric irregularities or anomalies in the tread face of "out-of-round" tires. An electric motor, operatively mounted on a portable platform is mechanically coupled to a cutting assembly comprising a plurality of blades mounted within a cylindrical drum.

The cutting assembly is arranged on the platform whereby the cutting blades will operatively engage the tread face to grind the eccentricities from the face of the tire as the tire is rotated by an external driving means. To prevent scattering of the material buffed or ground from the tread face the cutting assembly is partially enclosed in an accumulator housing adapted to catch and collect this residue. A pluraltity of apertures is formed in the rear portion of the housing which permits the air pressure built up in advance of the high speed rotation of the blades to flow rewardly through the housing carrying the material residue rewardly under the force of the resultant pressure differential. Attached to the aft portion of the platform is a substantially U-shaped handle which in combination with a series of rollers attached to the under portion of the platform permits movement of the device over the supporting surface.

9 Claims, 5 Drawing Figures

PATENTED OCT 9 1973 3,763,914
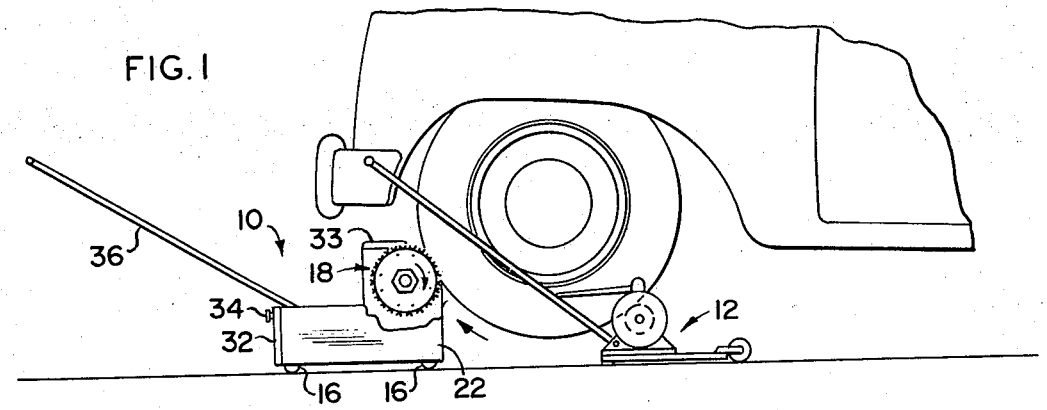
FIG. 1
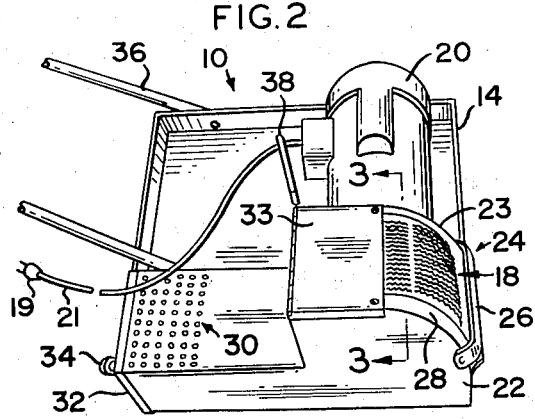
FIG. 2
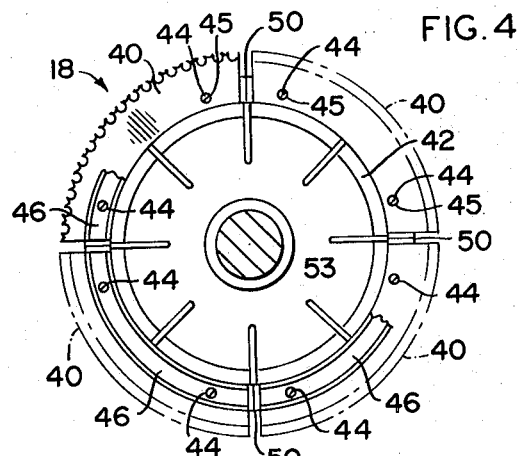
FIG. 4
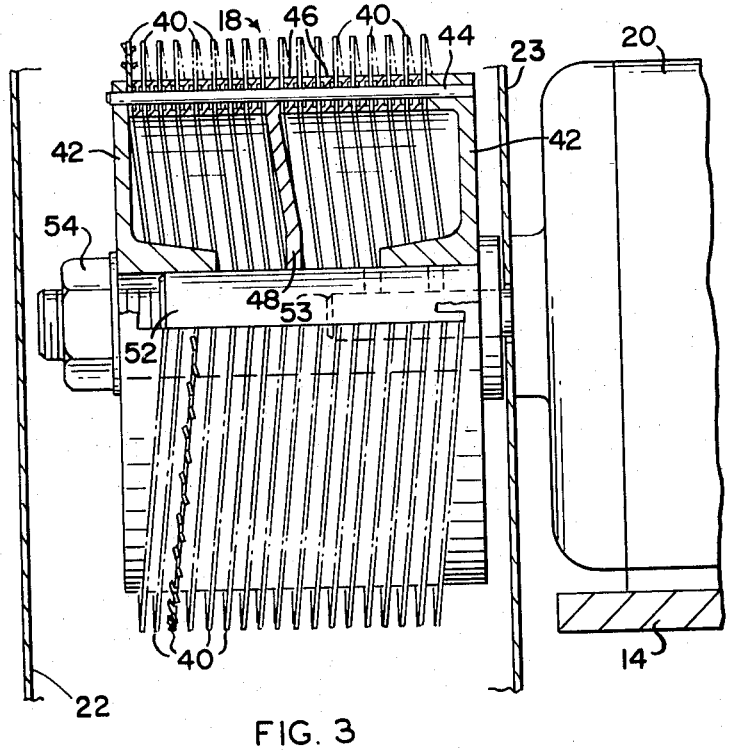
FIG. 3
FIG. 5
INVENTOR.
EDWARD G. VANCE
BY Law Offices of
Stefan M. Stein
ATTORNEY.

TIRE TRUEING MACHINE

The cutting assembly is arranged on the platform whereby the cutting blades will operatively engage the tread face to grind the eccentricities from he face of the tire as the tire is rotated by an external driving means. To prevent scattering of the material buffed or ground from the tread face the cutting assembly is partially enclosed in an accumulator housing adapted to catch and collect this residue. A plurality of apertures is formed in the rear portion of the housing which permits the air pressure built up in advance of the high speed rotation of the blades to flow rewardly through the housing carrying the material residue rewardly under the force of the resultant pressure differential. Attached to the aft portion of the platform is a substantially U-shaped handle which in combination with a series of rollers attached to the under portion of the platform permits movement of the device over the supporting surface

BACKGROUND OF THE INVENTION

1. Field of the Invention

This invention relates to a device for trueing non-symmetrical, non-concentric automotive tires. More specifically, this invention relates to a machine for cutting off imperfections or eccentricities from the tread face of an automotive tire by a plurality of blades driven by an external electric motor as the tire is rotated at a high rate of speed.

2. Description of the Prior Art

It is common knowledge that non-uniform tires cause excessive tire wear, riding discomfort and generally impair the handling qualities of the vehicle itself. Such eccentricities do result during the manufacturing of the tires or during the operation of the vehicle where the tire is exposed to severe bumps or misalignment.

Because such problems are commonplace a number of tire trueing machines have been known in the art for some years. For example, U.S. Pat. No. 3,491,493 discloses a tire uniformity optimizer. It is known that the maximum point of force observed on a rotating tire is located at the point of maximum eccentricity. With this apparatus, a tire is mounted on an eccentrically aligned tire inflating rim whereby the maximum force point aligns with the maximum eccentricity point. An abrasion means is then positioned so that it just engages the tread face at the point of maximum force and eccentricity. As the tire is rotated the abrasion means, a grinding wheel, moves radially inward a distance equal to the depth of the tread imperfection thereby removing the eccentricity by this buffing operation. The operation is then repeated on the opposite shoulder rib. Although this optimizer provides a maximum degree of uniformity in the dynamic behavior of the tire, it requires that the tire be removed from the automotive vehicle in order to effect the trueing action.

Another tire trueing apparatus, U.S. Pat. No. 2,918,116, comprises a stationary apparatus for cutting the treaded periphery of a tire which is rotatably mounted on an axis parallel to the axis of a rotary cutter. A rotating spindle driving means engages the tire tread as it is mounted on the frame such that is may be fed toward the cutter so as to regulate the depth of the cut. Also included is a vacuum fan connected by a conduit to the bottom of a housing for collecting the rubber shavings, chips and dust resulting from the trueing operation.

Still another device, U.S. Pat. No. 2,897,882, discloses a tire trueing machine comprising a rectangular base frame on which is mounted two spaced parallel shafts with knurled surfaces for tractive engagement with the tread face of the tire. These shafts are rotated through a dual pulley arrangement which, in turn, imparts a rotational moment to the tire. Also operatively mounted on the base is a cutting head comprising a disc having a plurality of sharp pointed pins coupled to an electric motor such that the cutting head can be rotated rapidly to cut a fine grain across the tread face of the tire when operatively engaged. This apparatus includes a means for chalk marking the eccentric irregularities so that as the pins cut the eccentricities in fine, thin portions from the tire all the chalk or marking material in the path of the cut will be removed. Thus the operator can detect that the eccentricities have been buffed from the tire surface when all the markings have been removed.

In addition to the device discussed above, a number of devices for cutting the tire tread from used tires for the purpose of retreading have been developed. These devices generally comprise a stationary tire supporting structure capable of rotating a tire at a slow rate of speed which in combination with various cutting elements operatively cooperate to cut the entire tread from the body or core of the tire.

Examination of the existing art reveals a number of tire trueing machines. Unfortunately, many of these, are stationary and not readily adaptable for use in filling stations or garage and new car shops where there is a need for such devices. Others, because of the nature of their cutting elements, slice excessively large portions of the tire tread rather than cutting or buffing the eccentricities off the tread face. Still others are unnecessarily complex and costly as where the apparatus includes a tire driving assembly in combination with the cutting assembly. Another disadvantage commonly found in such devices is the necessity of dismounting the wheel from the automotive vehicle in order to accomplish the tire trueing process.

Thus despite the large number of machines available, the conventional tire trueing machine is generally costly in terms of capital expense and operating inefficiencies and in many instances do not effectively "true" tires as they are not able to mount the tire in the machines accurately.

SUMMARY OF THE INVENTION

The present invention relates to a tire trueing machine for removing eccentricities from the tread face of a non-symmetrical, non-concentric tire. As previously described, irregularities in the tread face of automotive tires may cause excessive tire wear, riding discomfort and actually impair the handling qualities of the automotive vehicle. The instant invention embodies a portable, relatively inexpensive machine for removing such irregularities The present invention comprises a platform mounted on a plurality of rollers suitably arranged on the platform so that the entire device may be easily moved over the supporting surface by means of a substantially U-shaped handle attached to the platform. A cutting assembly comprising a plurality of interrupted blades arranged within a cylindrical drum is mechanically coupled to an electrically driven motor operatively mounted on the platform.

The cutting assembly is housed within a substantially L-shaped accumulator which collects the residue buffed from the tread face during the operation of the machine. The longer side of the L-shaped accumulator extends horizontally along the side of the platform while the shorter side of the L extends vertically upwardly and particially encloses the cutting assembly. The upper, forward portion of the housing immediately surrounding the cutting assembly is open to expose the forward most portion of the cutting blades to the tread face. A plurality of apertures is formed in the upper horizontal surface of the accumulator. In addition, a vertically disposed door or hatch is hingedly mounted at the rear portion of the accumulator. Another door is hingedly mounted on the top of the accumulator to permit the removal of the cutting assembly.

In operation, the vehicle is raised several inches above the supporting surface by means of a hydraulic lift or like device permitting the tire to be rotated freely by some external driving means. As the tire is rotated at a relative slow rate the operator positions the cutting assembly immediatedly adjacent to the tread face where the axle of the tire and the axle of the mechanical coupling between the electric motor and cutting assembly are essentially parallel to each other. As the cutting blades are rotated, the exposed portion of the cutting blades is pressed against the rotating tire causing the outer most portion of the tire to operatively engage the cutting blades. Since the radii of the irregularities or eccentricities extend outward from the concentric tread face these anomalies are cut or buffed off. Initially the irregularities cause the entire machine to buffet or vibrate. However, as the tire is "trued" the buffet diminishes and ultimately disappears when that portion of the tire is no longer eccentric. The trueing process is continued across the width of the tread until all of the irregularities have been removed.

The rotation of the cutting blades forces the residue downward into the accumulator where the turbulent air generated in advance of the rapidly rotating blades carries the residue rearwardly through the accumulator as the air flows aft. As the air reaches the aft portion of the accumulator it escapes through the apertures leaving the residue deposited in the accumulator. From time to time the residue is manually removed through the hatch at the rear of the accumulator.

The operator repeats the process for the remaining tires by manually repositioning the machine in operative relation to each tire in succession.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with accompanying drawings, which:

FIG. 1 shows a side view of the present invention operatively engaged with a automotive tire being driven by an external driving means.

FIG. 2 shows a perspective view of the present invention.

FIG. 3 shows a cross-sectional view of the cutting assembly along line 3—3 of FIG. 2.

FIG. 4 shows a cross-sectional end view of the cutting assembly.

FIG. 5 shows perspective view of an external driving means for rotating the automotive tire.

Similar reference characters refer to similar parts throughout several views of the drawings.

DETAILED DESCRIPTION

FIG. 1 shows the tire trueing machine 10 operatively engaged with an automobile which is, in turn, being rotated by an external driving means 12.

As best seen in FIGS. 1 and 2, the machine 10 comprises a substantially rectangular platform 14 supported on four rollers 16 or like elements arranged at the corners of platform 14 and a cutting assembly 18 which is mechanically coupled at an electrically driven motor 20 connected to external power through plug 19 and chord 21.

A stabilizing means which may be in the form of a plurality of weighted members is arranged on platform 14 (not shown) to minimize the buffeting or vibration of the machine 10 when operatively engaged with a tire. Alternatively the stablizing means may be the inherent weight of the platform 14 itself.

The cutting assembly 18 is partially enclosed within the forward portion of a substantially L-shaped accumulator housing 22 including removably plate 23 which collects the residue buffed from the tread face during the operation of the machine 10. The upper, forward portion 24 of accumulator 22 is open to expose the cutting assembly to the tread face. Accumulator 22 includes a lip 26 and flange 28. Formed on the upper surface of the accumulator 22 is a plurality of apertures 30. In addition, a vertically disposed door 32 including knob 34 is hingedly attached to the rear portion of the accumulator 22.

A substantially U-shaped handle 36 or lever is attached to the rear portion of the platform 14.

A pad eye 38 is detachably mounted on the top surface of the platform 14 for mechanically lifting the entire machine 10.

A second door 33 is hingedly attached immediately above the cutting assembly 18.

The cutting assembly 18 is shown in detail in FIGS. 3 and 4. The assembly 18 comprises a plurality of interrupted sawtooth blades 40 angularly mounted between end plates 42 by means of retaining rods 44 which pass essentially perpendicularly through apertures 45 formed in blades 40.

These blades 40 are arranged about the periphery of the assembly 18 in four sets of 18 blades each; each set displaced 90° from the adjacent set. Each set of blades 40 is separated or interrupted from the adjacent set by spacers 50.

Each blade 40 within a set is fixed in parallel spaced relationship to each of the other blades within that set by the operative cooperation of spacers 46 located between each pair of blades 40 and two horizontally disposed rods 44. Strength member 48 is mounted at the mid-point between end plates 42 and substantially parallel thereto to reduce the stress on rods 44.

The entire assembly 18 is coupled to motor 20 by coupling 52 mounted on motor shaft 53; the outer portion of which is threaded to cooperatively engage a nut 54 to secure the assembly 18 to the coupling 52 within accumulator housing 22.

To operate, the forward portion of machine 10 is positioned parallel to the tread of the tire with the cutting assembly 18 immediately adjacent to the tire. With the tire driven by an external means such as shown in FIG. 5 and cutting assembly 18 rotating in opposite directions, the blades 40 are operatively engaged by applying pressure through handle 36. Initially, the irregular tires will cause the machine 10 to buffet or vibrate. However, when the tire is "trued" the buffeting will diminish and ultimately disappear as that portion of the tire is no longer eccentric. The trueing process is continued over the entire width of the tire tread by repositioning the machine 10 transversely across the tread face. Since the blades 40 are angularly disposed they buff across the tread thus avoiding the cutting of any pronounced grooves in the tread itself.

As the blades 40 rotate downward (as shown in FIG. 1) the residue is forced down into the forward portion of the accumulator 22. The turbulent air generated in advance of the rapidly rotary blades 40 flows rewardly through the accumulator 22 carrying with it the residue and passes outwardly through apertures 30 leaving the residue deposits in the aft portion of the accumulator 22. From time to time the residue may be removed through door 34. Lip 26 and flange 28 prevent residue blow-back through the forward opening 24 in the accumulator 22.

To continue the process the operator manually repositions the machine 10 in operative relation to each of the remaining tires in succession by means of handle 36 and rollers 16.

By removing nut 54 and plate 23 and opening door 33 the cutting assembly 18 may be removed to permit changing or rotation of the blades 40.

It will thus be seen that the objects set forth above, among those made apparent from the preceding description, are efficently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, all statements of the scope of the invention which, as a matter of language, might be said to fall therebetween.

Now that the invention has been described, What Is Claimed Is:

1. A tire truing machine of the type designed to true non-symmetrical, nonconcentric automotive tires, said machine comprising: platform means, cutting means arranged on said platform means to grind the eccentricities of a tread face of the tire and arranged to movably engage the tread face of the tire, said cutting means comprising a plurality of interrupted saw tooth blades arranged within a cylindrical drum, said blades fixed in parallel relation relative to one another by the cooperative engagement of spacers arranged between each said blade and axially disposed retaining means which passes through each said blade and each said spacer, said retaining means fixed to opposite ends of said cylindrical drum, driving means mounted on said platform means operatively coupled to said cutting means to rotate said cutting means when said driving means is actuated, and accumulator means at least partially enclosing said cutting assembly to collect residue buffed from said tread face during the truing process, said accumulator means including means for removing said residue.

2. A machine as in claim 1 wherein said cutting means comprises a plurality of interrupted saw-tooth blades arranged within a cylindrical drum, said blades fixed in parallel relation relative to one another by the cooperative engagement of spacers arranged between each said blade and axially disposed retaining means which passes through each said blade and each said spacer, said retaining means fixed to opposite ends of said cylindrical drum.

3. A machine as in claim 1 wherein said interrupted saw-tooth blades are angularly disposed relative to tread face.

4. A machine as in claim 1 wherein said cutting means includes at least one strength member mounted in supporting interconnecting relation to said interrupted saw-tooth blades.

5. A machine as in claim 1 further including support means attached to said platform means to move said machine over the supporting surface.

6. A machine as in claim 1 wherein said accumulator means comprises a housing including a plurality of apertures formed in the rearward portion of said housing whereby the air pressure generated in advance of the rapidly rotating cutting assembly flows rearwardly within said housing carrying the residue buffed from the tread face.

7. A machine as in claim 6 wherein said accumulator means comprises a substantially L-shaped housing which encloses said cutting means.

8. A machine as in claim 7 wherein the forward portion of said substantially L-shaped housing is open to permit operative engagement between said cutting means and said tire.

9. A machine as in claim 8 wherein a lip is formed on said opening of said housing to prevent residue blow-back during operation of said machine.

* * * * *

UNITED STATES PATENT OFFICE
CERTIFICATE OF CORRECTION

Patent No. 3,763,914        Dated October 9, 1973

Inventor(s) Edison G. Vance

It is certified that error appears in the above-identified patent and that said Letters Patent are hereby corrected as shown below:

Column 1, delete lines 1 through 20.

Signed and sealed this 11th day of June 1974.

(SEAL)
Attest:

EDWARD M. FLETCHER, JR.
Attesting Officer

C. MARSHALL DANN
Commissioner of Patents